(12) United States Patent
Chinni

(10) Patent No.: US 11,591,012 B2
(45) Date of Patent: Feb. 28, 2023

(54) VEHICLE TRAJECTORY PREDICTION USING ROAD TOPOLOGY AND TRAFFIC PARTICIPANT OBJECT STATES

(71) Applicant: Robert Bosch GmbH, Stuttgart (DE)

(72) Inventor: Krishna Mohan Chinni, Canton, MI (US)

(73) Assignee: Robert Bosch GmbH, Stuttgart (DE)

( * ) Notice: Subject to any disclaimer, the term of this patent is extended or adjusted under 35 U.S.C. 154(b) by 183 days.

(21) Appl. No.: 16/590,112

(22) Filed: Oct. 1, 2019

(65) Prior Publication Data

US 2021/0094612 A1   Apr. 1, 2021

(51) Int. Cl.
| | |
|---|---|
| G06N 3/08 | (2006.01) |
| G06V 20/58 | (2022.01) |
| B62D 6/00 | (2006.01) |
| G05D 1/02 | (2020.01) |
| G05D 1/00 | (2006.01) |
| G06V 20/56 | (2022.01) |

(52) U.S. Cl.
CPC ........... *B62D 6/002* (2013.01); *G05D 1/0088* (2013.01); *G05D 1/0214* (2013.01); *G05D 1/0253* (2013.01); *G06N 3/08* (2013.01); *G06V 20/58* (2022.01); *G06V 20/588* (2022.01)

(58) Field of Classification Search
CPC .... B62D 6/002; G05D 1/0088; G05D 1/0214; G05D 1/0253; G06K 9/00798; G06K 9/00805; G06N 3/08
USPC .......................................................... 701/41
See application file for complete search history.

(56) References Cited

U.S. PATENT DOCUMENTS

| | | | |
|---|---|---|---|
| 8,478,642 B2 | 7/2013 | Dey et al. | |
| 9,463,797 B2 | 10/2016 | Damerow et al. | |
| 2014/0379247 A1* | 12/2014 | Ferguson | B60W 30/16 |
| | | | 701/301 |
| 2018/0130095 A1 | 5/2018 | Khoury | |
| 2018/0173240 A1* | 6/2018 | Fang | G05D 1/0289 |
| 2018/0322715 A1 | 11/2018 | Toyoda et al. | |
| 2018/0365888 A1* | 12/2018 | Satzoda | G06K 9/00791 |
| 2019/0072965 A1* | 3/2019 | Zhang | G05D 1/0088 |
| 2019/0129436 A1 | 5/2019 | Sun et al. | |
| 2020/0249674 A1* | 8/2020 | Dally | G05D 1/0221 |
| 2021/0001773 A1* | 1/2021 | Miller, Jr. | G06T 5/002 |
| 2021/0009166 A1* | 1/2021 | Li | B60W 60/00272 |

FOREIGN PATENT DOCUMENTS

DE   112013004890   *   8/2018

* cited by examiner

*Primary Examiner* — Elaine Gort
*Assistant Examiner* — Matthias S Weisfeld
(74) *Attorney, Agent, or Firm* — Michael Best & Friedrich LLP

(57) ABSTRACT

System, method, and device for controlling a vehicle. In one example, the system includes an electronic processor configured to capture, via a camera, a first image, determine, within the first image, a road traffic factor, and generate, based on sensor information from one or more sensors of the vehicle, a second image depicting an environment surrounding the vehicle. The second image includes the road traffic factor. The electronic processor is also configured to, determine, based on the detected road traffic factor and the second image, a predicted trajectory of a traffic participant proximate to the vehicle, and generate a steering command for the vehicle based on the predicted trajectory.

17 Claims, 4 Drawing Sheets

VEHICLE TRAJECTORY PREDICTION USING ROAD TOPOLOGY AND TRAFFIC PARTICIPANT OBJECT STATES

BACKGROUND OF THE INVENTION

Modern vehicles include various partially autonomous driving functions, for example adaptive cruise-control, collision avoidance systems, self-parking, and the like. One aspect of autonomous driving systems is behavior planning/prediction.

SUMMARY

As mentioned above, one aspect of an autonomous driving systems is behavior planning/prediction. In neural networks, sensor information is often processed by a perception module. After the sensor information is processed in a perception module, the next step is to utilize the processed information to determine a trajectory for a vehicle to follow. When determining the vehicle trajectory, the future trajectories of other traffic participants (other vehicles on the road/environment surrounding the vehicle) is also considered. Many current behavior prediction algorithms consider the current state of the traffic participants to predict their future trajectory. However, this may not be enough information to ensure that an accurate predicted trajectory is determined.

Factors that may be considered when determining a future trajectory of a traffic participant include road topology, traffic signs/rules, and the like. The future behavior of the traffic participants depends, to some extent, on these features. Therefore, embodiments herein describe, among other things, a system and method for driving a vehicle based on predicting trajectories of traffic participants proximate to the vehicle while considering particular traffic factors that may impact the likelihood of certain future trajectories. Embodiments provide, among other things, indications of traffic signs, lane markings, and the like in addition to past dynamics of one or more traffic participants within the environment surrounding the vehicle in a simple image format to a neural network. Using a simple image format simplifies and improves the accuracy of classification of objects in the vehicle's surrounding environment. The accuracy of predicted trajectories of traffic participants is also improved.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
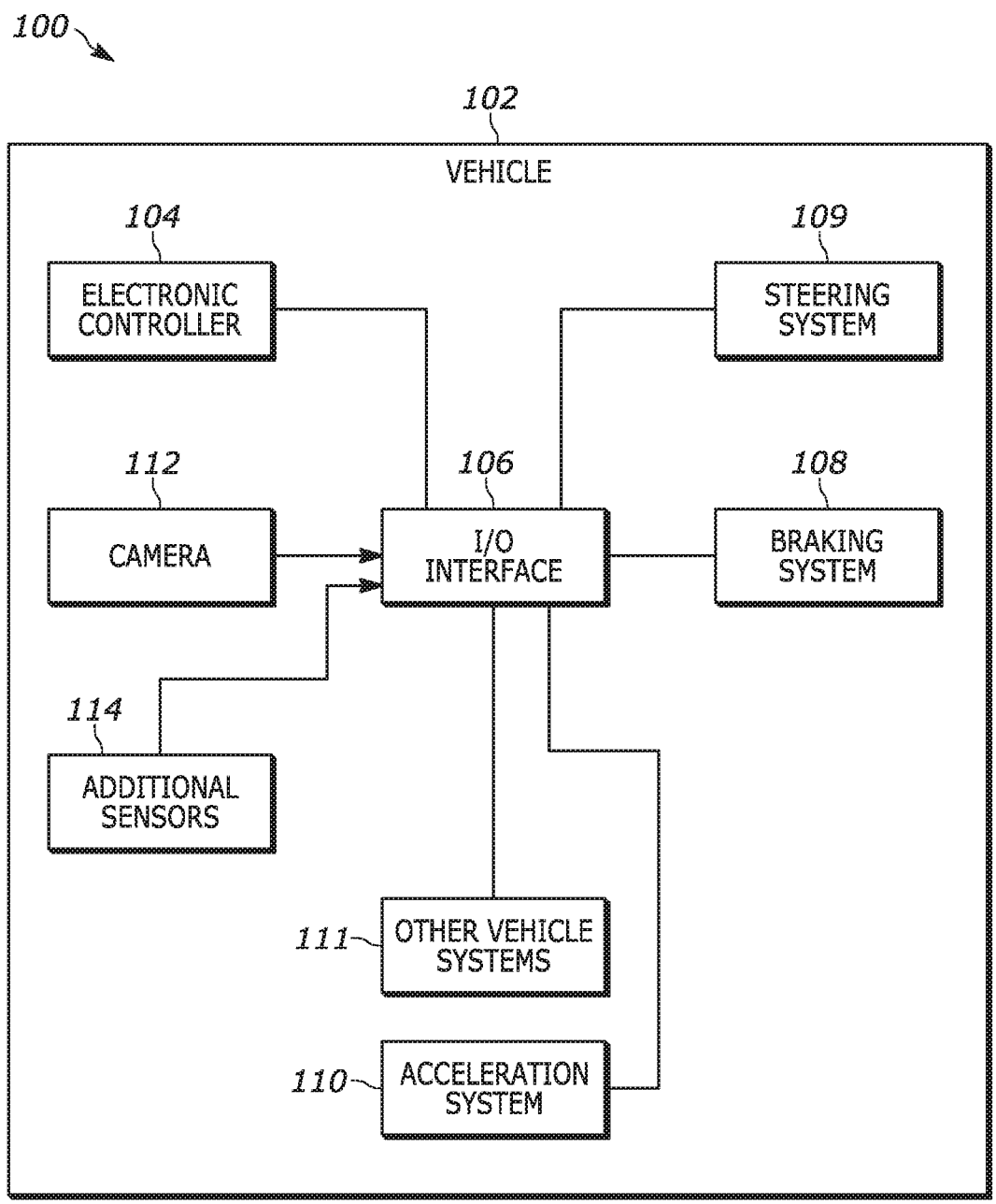
FIG. 1 is a block diagram of a system for driving a vehicle according to one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One example embodiment provides a system for driving a vehicle. The system includes an electronic processor configured to capture, via a camera, a first image, determine, within the first image, a road traffic factor, generate, based on sensor information from one or more sensors of the vehicle, a second image depicting an environment surrounding the vehicle, the second image including the road traffic factor, determine, based on the detected road traffic factor and the second image, a predicted trajectory of a traffic participant proximate to the vehicle, and generate a steering command for the vehicle based on the predicted trajectory.

Another embodiment provides a device for controlling a vehicle. The device includes one or more sensors, including a camera, communicatively coupled to an electronic processor, the electronic processor configured to capture, via the camera, a first image, determine, within the first image, a road traffic factor, generate, based on sensor information from the one or more sensors of the vehicle, a second image depicting an environment surrounding the vehicle, the second image including the road traffic factor, determine, based on the detected road traffic factor and the second image, a predicted trajectory of a traffic participant proximate to the vehicle, and generate a steering command for the vehicle based on the predicted trajectory.

Another embodiment provides a method of controlling a vehicle. The method includes capturing, via a camera, a first image, determining, within the first image, a road traffic factor, generating, based on sensor information from one or more sensors of the vehicle, a second image depicting an environment surrounding the vehicle, including the road traffic factor, determining, based on the detected road traffic factor and the second image, a predicted trajectory of a traffic participant proximate to the vehicle, and generating a steering command for the vehicle based on the predicted trajectory.

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more communication interfaces, one or more application specific integrated circuits (ASICs), and various connections (for example, a system bus) connecting the various components.

FIG. 1 illustrates a system 100 for autonomous driving. The system 100 includes a vehicle 102. The vehicle 102 may encompass various types and designs of vehicles. For example, the vehicle 102 may be an automobile, a motorcycle, a truck, a bus, a semi-tractor, and others. The vehicle 102 includes at least some autonomous functionality, but may also require a driver or operator to perform driving functions.

In the example illustrated, the system 100 includes several hardware components including an electronic controller 104, an input/output (I/O) interface 106, a braking system 108, a steering system 109, an acceleration system 110, other vehicle systems 111, a camera 112, and additional sensors 114.

The electronic controller 104, the braking system 108, the steering system 109, acceleration system 110, images sensors 112, additional sensors 114, and the other vehicle systems 111, as well as other various modules and components of the system 100 are coupled to each other by or through one or more control or data buses (for example, a CAN bus), which enable communication therebetween. The use of control and data buses for the interconnection between and exchange of information among the various modules and components would be apparent to a person skilled in the art in view of the description provided herein.

The camera 112 is configured to capture one or more images of the environment surrounding the vehicle 102 according to their respective fields of view. Although described herein in terms of camera images, it should be understood that the camera 112, in some embodiments, may be (or include) one or more of a thermal imaging device, a radar device, a sonar device, and the like. In some embodiments, the camera 112 include multiple types of imaging devices/sensors, each of which may be located at different positions on the interior or exterior of the vehicle 102. Although described in terms of a single camera 112, it should be understood that, in some embodiments, the camera 112 may be a multiple image sensors.

The electronic controller 104 is communicatively connected to the steering system 109, braking system 108, other vehicle systems 111, camera 112, and additional sensors 114 via various wired or wireless connections. For example, in some embodiments, the electronic controller 104 is directly coupled via a dedicated wire to each of the above-listed components of the vehicle 102. In other embodiments, the electronic controller 104 is communicatively coupled to one or more of the components via a shared communication link such as a vehicle communication bus (for example, a controller area network (CAN) bus) or a wireless connection. It should be understood that each of the components of the vehicle 102 may communicate with the electronic controller 104 using various communication protocols. The embodiment illustrated in FIG. 1 provides but one example of the components and connections of the vehicle 102. Thus, the components and connections of the vehicle 102 may be constructed in other ways than those illustrated and described herein.

Figure 2:
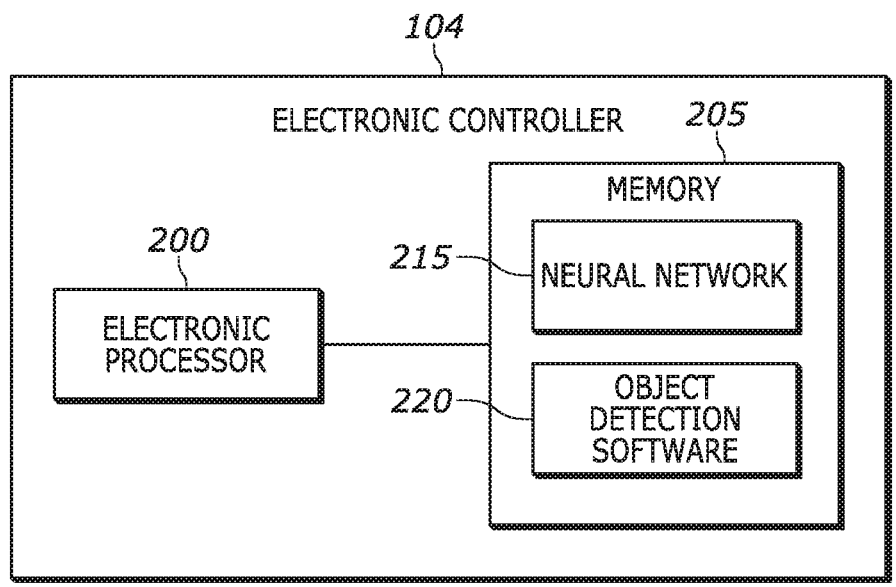
FIG. 2 is a block diagram of an electronic controller of the system of FIG. 1 according to one embodiment.

FIG. 2 is a block diagram of one example embodiment of the electronic controller 104 of the system 100 of FIG. 1. The electronic controller 104 includes a plurality of electrical and electronic components that provide power, operation control, and protection to the components and modules within the electronic controller 104. The electronic controller 104 includes, among other things, an electronic processor 200 (such as a programmable electronic microprocessor, microcontroller, or similar device) and a memory 205 (for example, non-transitory, machine readable memory). The electronic processor 200 is communicatively connected to the memory 205. The electronic processor 200, in coordination with the memory 205, is configured to implement, among other things, the methods described herein.

In some embodiments, the electronic controller 104 includes a plurality of electrical and electronic components that provide power, operational control, and protection to the components and modules within the electronic controller 104. The electronic controller 104 may be or may include one or more electronic control units including, for example, an engine control module, a powertrain control module, a transmission control module, a general electronic module, and the like. The electronic controller 104 may contain sub-modules that include additional electronic processors, memory, or application specific integrated circuits (ASICs) for handling communication functions, processing of signals, and application of the methods listed below. In other embodiments, the electronic controller 104 includes additional, fewer, or different components. The electronic processor 200 and the memory 205, as well as the other various modules, are connected by one or more control or data buses. In some embodiments, the electronic controller 104 is implemented partially or entirely in hardware (for example, using a field-programmable gate array ("FPGA"), an application specific integrated circuit ("ASIC"), or other devices.

The memory 205 can include one or more non-transitory computer-readable media, and includes a program storage area and a data storage area. As used in the present application, "non-transitory computer-readable media" comprises all computer-readable media but does not consist of a transitory, propagating signal. The program storage area and the data storage area can include combinations of different types of memory, for example, read-only memory ("ROM"), random access memory ("RAM"), electrically erasable programmable read-only memory ("EEPROM"), flash memory, or other suitable digital memory devices. The electronic processor 200 is connected to the memory 205 and executes software, including firmware, one or more applications, program data, filters, rules, one or more program modules, and other executable instructions. The electronic processor 200 retrieves from the memory 205 and executes, among other things, instructions related to the control processes and methods described herein. In other embodiments, the electronic controller 104 may include additional, fewer, or different components.

Figure 3:
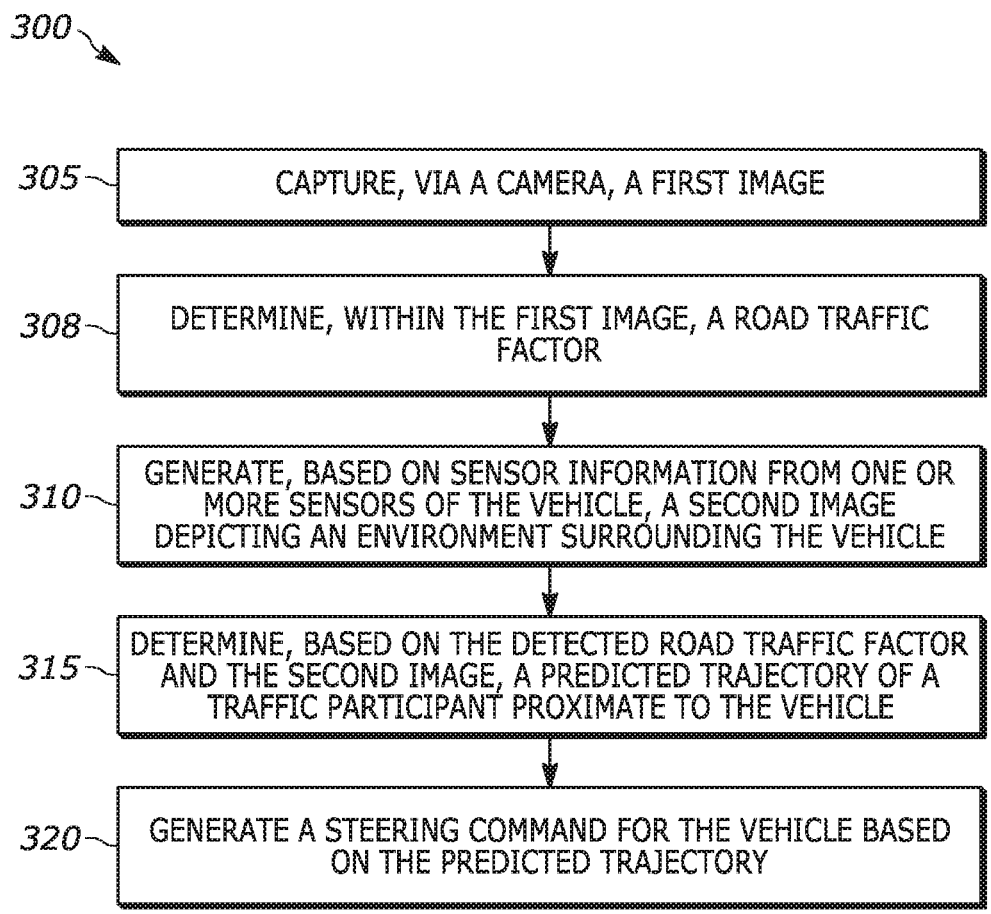
FIG. 3 is a flowchart of a method of using the controller of FIG. 2 to drive the vehicle of FIG. 1 according to one embodiment.

The memory 205 of the electronic controller 104 includes software that, when executed by the electronic processor 200, causes the electronic processor 200 to perform the method 300 illustrated in FIG. 3. For example, the memory 205 illustrated in FIG. 2 includes a neural network 215 and object detection software 220. The neural network 215 may be a deep neural network (for example, a convolutional neural network (CNN) or a recurrent neural network (RNN)). The neural network 215 includes one or more input channels, allowing the neural network 215 to analyze image data from the camera 112 (and, in some embodiments, sensor data from the additional sensors 114) simultaneously to classify an object in the vehicle's surrounding environment and an action being performed by the object. The object may be, for example, a participant (another vehicle/motorist) on the road in which the vehicle 102 is on, in which case the action of the road participant should be determined. In some embodiments, the neural network 215 is trained to classify objects and actions that they are performing using a training set of images of and/or sensor data corresponding to the one or more participants on the road.

In some embodiments, the electronic processor 200, when executing the object detection software 220, uses machine learning techniques to detect, in an image received from the camera 112, objects that may impact the movement of the vehicle 102. For example, the object detection software 220 may include a convolutional neural network that has been trained to recognize vehicles, people, animals, a combination of the foregoing, and the like. Other types of sensor data may also be utilized by the object detection software 220.

As mentioned above, in determining a future trajectory of a vehicle, the system 100 may determine the appropriate trajectory based on the moving trajectory of the other traffic participants within the environment surrounding the vehicle. As explained in more detail below, the electronic controller 104 is configured to generate an image depicting an environment surrounding the vehicle including road traffic factors including traffic signs and road lines in addition to traffic participants to be considered in predicting the trajectory of other traffic participants.

Returning to FIG. 1, the braking system 108, the steering system 109, and the acceleration system 110 each include components involved in the autonomous or manual control of the movement of the vehicle 102. The electronic controller 104 may be configured to control some or all functionality of one or more of the systems 108, 109, and 110 in order to steer and drive the vehicle. In some embodiments, the controller 104 may have limited control over the systems 108, 109, and 110 and some or all driving may be controlled by the driver of the vehicle 102.

The other vehicle systems 111 include controllers, sensors, actuators, and the like for controlling aspects of the operation of the vehicle 102 (for example, acceleration, braking, shifting gears, and the like). The other vehicle systems 111 are configured to send and receive data relating to the operation of the vehicle 102 to and from the electronic controller 104.

FIG. 3 illustrates an example method 300 of driving a vehicle based on a predicted trajectory of a vehicle 102. At step 305, the electronic processor 200 captures, via a camera (for example, the camera 112) a first image and determines, within the first image, a road traffic factor (block 308). The electronic processor 200 generates, based on sensor information from one or more sensors (camera 112 and/or additional sensors 114) of the vehicle, a second image depicting an environment surrounding the vehicle 102 (block 310), which is explained in more detail in regard to FIG. 3 below.

A road traffic factor is in object whose presence (for example, action or significance) within the environment surrounding the vehicle 102 may impact/influence a future trajectory of one or more traffic participants proximate to the vehicle 102. The term proximate should be understood as being within a predetermined range of the vehicle 102. In one example, the range is within 24 feet of the vehicle 102 determined, for example, via video or image analytics, ultrasonic distance sensing, or radio signal transmission range. In some embodiments, the predetermined range is adjusted based on the speed of the vehicle 102. For example, when the vehicle 102 is moving at a freeway speed (for example, approximately 60 miles per hour), the predetermined range may be greater than when the vehicle is moving at a residential area speed (for example, approximately 30 miles per hour). For example, a road traffic factor may be a traffic sign, a traffic light, a road marking, and/or a trajectory of an object within a predetermined range of the traffic participant. In regard to the traffic sign, traffic light, and the road marking, the particular significance of each is considered in the determination of the predicted trajectory of the traffic participants proximate to the vehicle 102 within the environment surrounding the vehicle 102. For example, when the electronic processor 200 detects with the image sensor(s) 112, for example, utilizing the object detection software 220, a stop sign within the environment in front of the vehicle 102, the electronic processor 200 may predict that (or add an additional weight to the probability that) the one or more vehicle participants proximate to the vehicle 102 travelling in the same general direction are going to slow down and stop before the stop sign. The object within a predetermined range (for example, approximately 5 feet) of the traffic participant may be an object whose position and/or particular trajectory influences the future trajectory of the traffic participant. The object may be, for example, a pedestrian or an obstacle such as a branch, a stopped vehicle, or other object. The object may be positioned or moving into a position that intersects a traffic participant's current trajectory, making it likely that the traffic participant will change their trajectory. The road traffic factor, as well as other objects within the environment surrounding the vehicle 102 may be determined using object recognition techniques via the object detection software 220, for example, CNNs.

Figure 5:
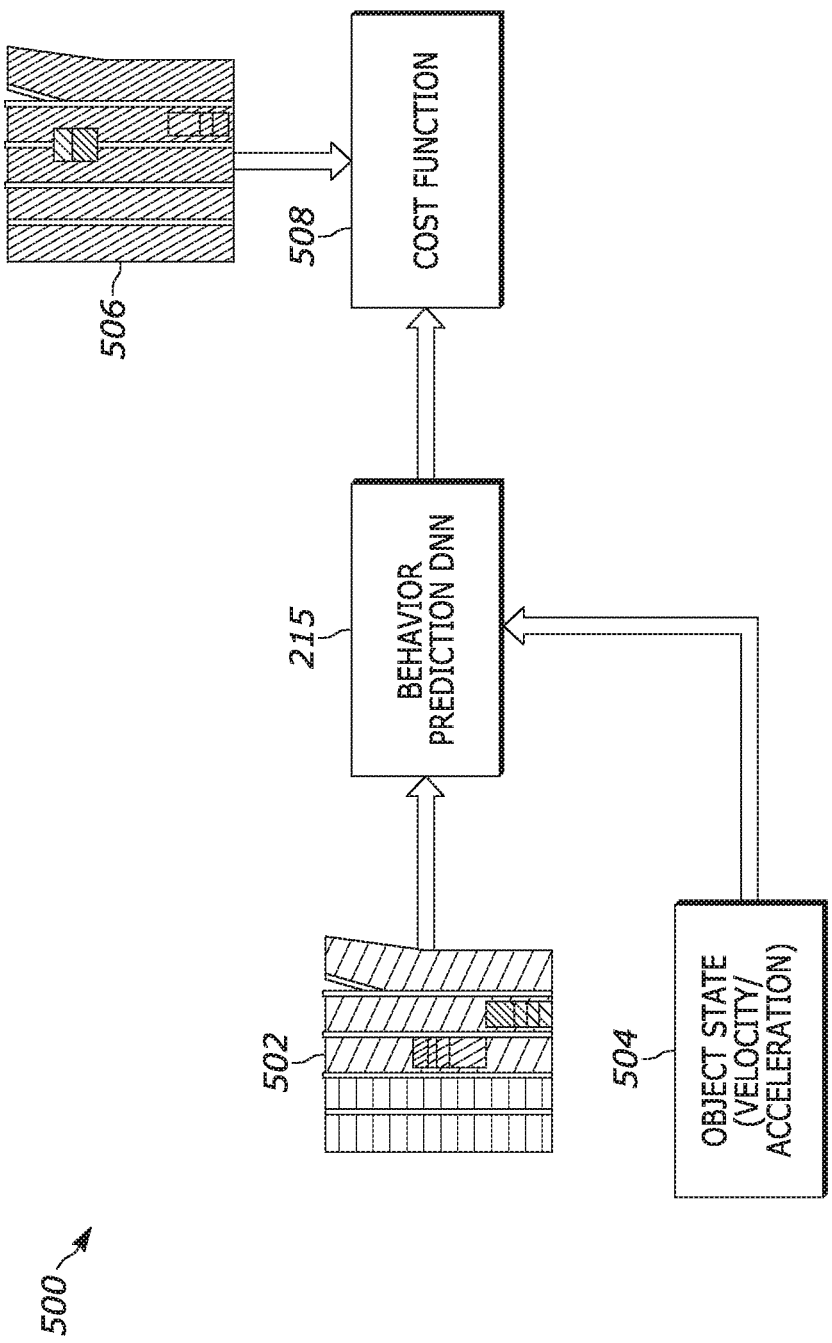
FIG. 5 is a flowchart illustrating a behavior prediction process implemented by the system of FIG. 1 during execution of the method of FIG. 3 according to one embodiment.

At block 315, the electronic processor 200 is configured to determine, based on the detected road factor (and image, as explained in more detail below), a predicted trajectory of a traffic participant proximate to the vehicle 102. In some embodiments (for example, as shown in FIG. 5 below), the electronic processor 200 determines the predicted trajectory based on the detected road factor and the image using a deep learning network. At block 320, the electronic processor 200 generates a steering command for the vehicle 102 based on the image 400 and the predicted trajectory (or trajectories). The steering command may be an automated/semi-automated driving function implemented by the electronic processor 200 via braking, accelerating, and/or turning the vehicle 102 (for example, via braking system 108, steering system 109, and/or acceleration system 110).

Figure 4:
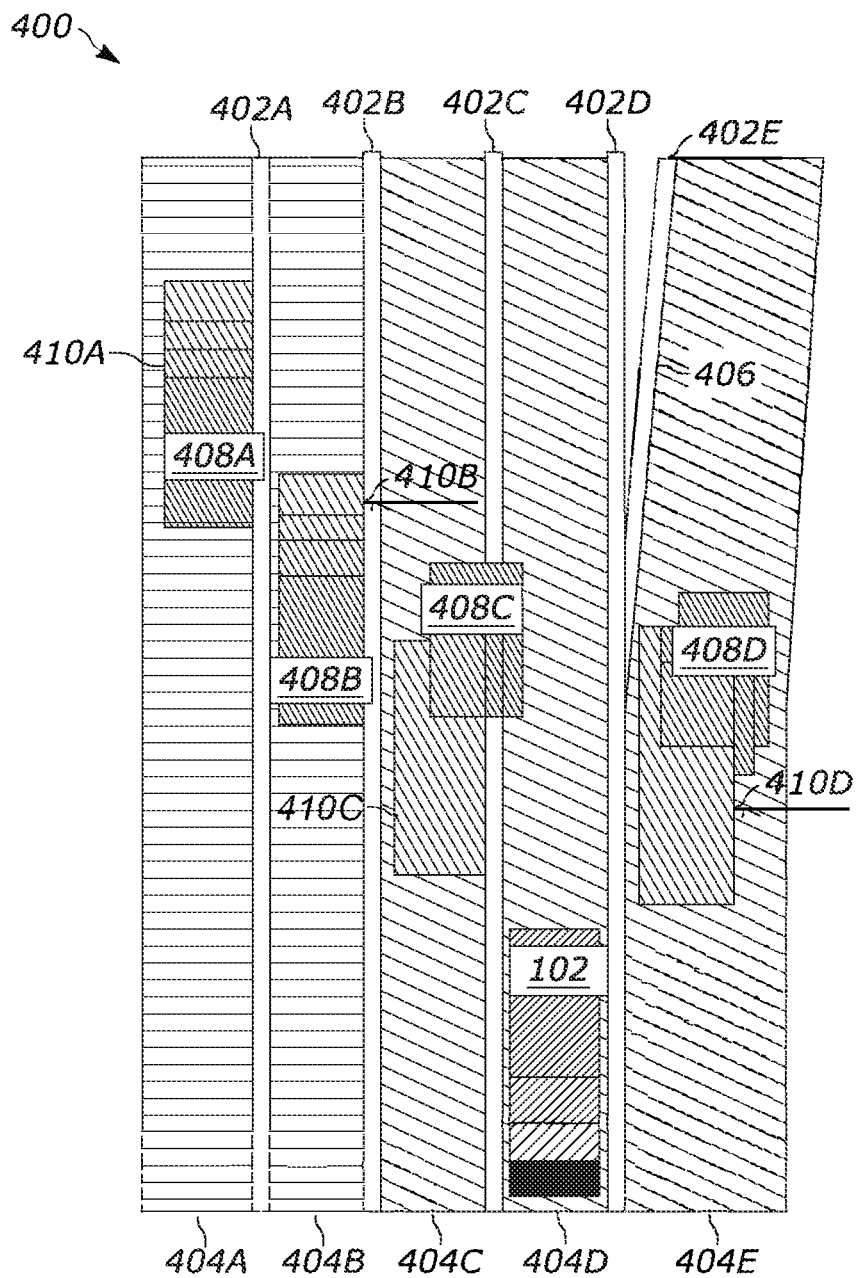
FIG. 4 is an image generated by the controller of FIG. 2 block diagram of a vehicle control system included in a vehicle of the system of FIG. 1 according to one embodiment.

FIG. 4 is an example image 400 generated at block 310 of the method 300 of FIG. 3. The image 400 illustrates the traffic environment surrounding the vehicle 102. In the example provided, the image 400 depicts a road topology (lanes, road curvature, direction of traffic, trajectory of traffic participants, and the like) of the environment surrounding the vehicle 102 in the form of a static image. In the illustrated embodiment, the road lines are depicted as solid, black lines 402A-402E. Different pattern and/or color markings may be used to indicate different types of road lanes (for example, whether the lane marking indicate that traffic in the same or opposite direction may pass over or not, whether there is a bicycle lane, etc.). The road lanes 404A-404E include a visual pattern/color indicative of the designated direction of traffic (for example, lanes 404A and 404B both include a horizontal-striped pattern, indicative of a first direction of traffic while lanes 404C-404E include a diagonal-striped pattern, indicative of a second direction of traffic. The image 400 further depicts the oncoming curvature 406 of lane 404E via the bend of road line 402E.

The image 400 includes one or more traffic participants 408A-408D and their respective previous positions (forming a respective previous trajectory 410A-410D) determined via the electronic processor 200 based on data from the camera 112 (and/or additional sensors 114). Similar to the lane and line markings, each traffic participant may be indicated by a particular color/pattern or shape. In some embodiments, the particular image representation of a traffic participant may be based on their previous trajectory, type of vehicle, or other characteristics. The trajectories 410A-410D may be illustrated, as shown in FIG. 4, via a gradient, the lightest portion (indicated by the greater-spaced halftone lines) of which being the earliest previous positon and the darkest (indicated by the denser-spaced halftone lines) being the latest position. The trajectories 410A-410D may be determined by the processor 200 based on previous sensor information from the camera 112 and/or additional sensors 114. In some embodiments, the processor 200 utilizes Gaussian blurring in the determination of the trajectories 410A-410D.

FIG. 5 is a flowchart 500 illustrating a prediction process utilized by the neural network 215 of the electronic processor 200 in accordance to some embodiments. The process may be utilized by the processor 200 at block 315 of the method 300 described above. As illustrated in FIG. 5, in some embodiments, the neural network 215 may be a behavior prediction deep neural network. For ease of description, the flowchart 500 is described in terms of a single traffic participant (here, traffic participant 408D). It should be understood that a similar process may be applied to additional traffic participants (for example, those of FIG. 4).

The image 400 is provided as an input for a neural network 215. In some embodiments, a modified version of the image 400 is provided to the neural network 215. The modified version of the image 400 may include traffic participant information that is most proximate to the vehicle 102 and/or whose previous trajectory indicate that they are intersecting or going to intersect the current trajectory of the vehicle 102. The traffic participants in the modified image may be, for example, within or entering the same lane as or in a lane neighboring the current lane in which the vehicle 102 is in within a particular radius of the vehicle 102.

For example, in the illustrated embodiment, the image provided to the neural network 215 is a modified image 502 of the image 400. The modified image 502 is a redacted version of the image 400 that includes a single traffic participant (here participant 408C). It should be understood that, when determining a future trajectory of other traffic participants, the image 400 may be modified similarly to omit other traffic participants. It should be understood that, although described herein in terms of modified image 502, the process illustrated in flowchart 500 may utilize the image 400 similarly. The redacted image 502 omits traffic participants 408A and 408B of image 400 (FIG. 4) because they are in lanes 404A and 404B, which are the opposite traffic direction of the lane 404D in which the vehicle 102 is in. Traffic participant 408D is omitted even though it is travelling in lane 404E, which neighbors lane 404D and has the same direction of traffic, because the curvature 406 indicates that the lane 404 separates from the lane 404D ahead. Traffic participant 408C (and its corresponding past trajectory 410C) is included in the modified image 502 because it is proximate to the vehicle 102 and, given its previous trajectory 410C, is moving toward the lane 404D from neighboring lane 404C, intersecting the current trajectory of the vehicle 102. In some embodiments, the modified image 502 includes visual information regarding more than one traffic participant. Road topology information may similarly be omitted/modified based on their proximity to the vehicle 102.

In addition to the image 502, object state information 504 in regard to the traffic participants of the image 502 that may not be obtained from the image 502 alone. Such information may include, for example, the velocity (the speed and direction of the vehicle 102) and/or acceleration (a change in speed of the vehicle 102 over time). Accordingly, in some embodiments, the predicted trajectory is determined based on either or both of a velocity and acceleration of the traffic participant.

In some embodiments, the predicted trajectory of the traffic participant proximate to the vehicle 102 is determined based on a predicted trajectory of a second traffic participant. For example, if there were another traffic participant ahead of traffic participant 408C in lane 404D that the processor 200 predicts will slow down, that prediction may be considered in the determination of the future trajectory of traffic participant 408C (for example, it decreases the likelihood that the participant 408C would enter lane 404D).

Based on the image 502 and the object state information 504, the behavior prediction neural network 215 determines one or more predicted (future) trajectories of the traffic participant within the image 502 (in the illustrated embodiment, traffic participant 408C). During the determination, the neural network 215 takes into account the one or more detected traffic factors that may influence to the future trajectory of the particular traffic participant illustrated in the image 502. For example, if there is a stop sign directly ahead of the lanes 404C and 404D, the processor 200 may determine, via neural network 215, that the traffic participant 408C will slow down in the immediate future, (depending on the distance from the stop sign).

In the illustrated embodiment, the label 506 (one of the several possible future trajectories) with the best cost function 508 (the greatest likelihood of being accurate) is determined. In other words, the processor 200 determines the based on the detected road traffic factor and image, a predicted trajectory of a traffic participant proximate to the vehicle 102. Accordingly, as described above, the electronic processor 200 generates an appropriate steering command for the vehicle 102 based on the predicted trajectory (and the image 400).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

In this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Various features, advantages, and embodiments are set forth in the following claims.

What is claimed is:

1. A system for controlling a vehicle, the system comprising:
   an electronic processor configured to
      capture, via a camera, a first image;
      determine, within the first image, a road traffic factor;
      generate, based on sensor information from one or more sensors of the vehicle and the first image, a second image symbolically depicting a simplified environment surrounding the vehicle corresponding to an actual environment surrounding the vehicle, the second image omitting a first traffic participant included in the first image, the second image including the road traffic factor and a symbolic pattern-coded or color-coded visual representation indicative of a respective designated direction of traffic of a lane of traffic;
      determine, based on the detected road traffic factor and the second image, a predicted trajectory of a second traffic participant proximate to the vehicle; and
      generate a steering command for the vehicle based on the predicted trajectory wherein the second image includes a historic trajectory of the second traffic participant, the historic trajectory being visually represented in the second image as a gradient of a plurality of color-coded or pattern-coded symbols, each of the plurality of symbols being of a different respective color or pattern, wherein a lightest respective color or pattern of the respective symbol of the plurality of color-coded symbols represents an earliest previous position of the second traffic participant.

2. The system of claim 1, wherein the electronic processor determines the predicted trajectory based on the detected road factor and the second image using a deep learning network.

3. The system of claim 1, wherein the electronic processor is further configured to determine the predicted trajectory based on either or both of a velocity and acceleration of the second traffic participant.

4. The system of claim 1, wherein the road traffic factor is at least one selected from the group consisting of a traffic sign, a traffic light, a road marking, and a trajectory of an object proximate to the second traffic participant.

5. The system of claim 1, wherein the electronic processor is further configured to determine the predicted trajectory of the second traffic participant proximate to the vehicle based on a predicted trajectory of a third traffic participant.

6. The system of claim 1, wherein the predicted trajectory is based on Gaussian blurring.

7. A device for controlling a vehicle, the device comprising:
   one or more sensors, including a camera, communicatively coupled to an electronic processor, the electronic processor configured to
      capture, via the camera, a first image;
      determine, within the first image, a road traffic factor;
      generate, based on sensor information from the one or more sensors of the vehicle and the first image, a second image symbolically depicting a simplified environment surrounding the vehicle corresponding to an actual environment surrounding the vehicle, the second image omitting a first traffic participant included in the first image, the second image including the road traffic factor and a symbolic pattern-coded or color-coded visual representation indicative of a respective designated direction of traffic of a lane of traffic;
      determine, based on the detected road traffic factor and the second image, a predicted trajectory of a second traffic participant proximate to the vehicle; and
      generate a steering command for the vehicle based on the predicted trajectory wherein the second image includes a historic trajectory of the second traffic participant, the historic trajectory being visually represented in the second image as a gradient of a plurality of color-coded or pattern-coded symbols, each of the plurality of symbols being of a different respective color or pattern, wherein a lightest respective color or pattern of the respective symbol of the plurality of color-coded symbols represents an earliest previous position of the second traffic participant.

8. The device of claim 7, wherein the electronic processor is further configured to determine the predicted trajectory based on either or both of a velocity and acceleration of the second traffic participant.

9. The device of claim 7, wherein the road traffic factor is at least one selected from the group consisting of a traffic sign, a traffic light, a road marking, and a trajectory of an object proximate to the second traffic participant.

10. The device of claim 7, wherein the electronic processor is further configured to determine the predicted trajectory of the second traffic participant proximate to the vehicle based on a predicted trajectory of a third traffic participant.

11. The device of claim 7, wherein the electronic processor determines the predicted trajectory based on the detected road factor and the second image using a deep learning network.

12. A method for controlling a vehicle, the method comprising:
   capturing, via a camera, a first image;
   determining, within the first image, a road traffic factor;
   generating, based on sensor information from one or more sensors of the vehicle and the first image, a second image symbolically depicting a simplified environment surrounding the vehicle corresponding to an actual environment surrounding the vehicle, the second image omitting a first traffic participant included in the first image, the second image including the road traffic factor and a symbolic pattern-coded or color-coded visual representation indicative of a designated direction of traffic of a lane of traffic;

determining, based on the detected road traffic factor and the second image, a predicted trajectory of a second traffic participant proximate to the vehicle; and generating a steering command for the vehicle based on the predicted trajectory wherein the second image includes a historic trajectory of the second traffic participant, the historic trajectory being visually represented in the second image as a gradient of a plurality of color-coded or pattern-coded symbols, each of the plurality of symbols being of a different respective color or pattern, wherein a lightest respective color or pattern of the respective symbol of the plurality of color-coded symbols represents an earliest previous position of the second traffic participant.

13. The method of claim 12, wherein the predicted trajectory is determined based on either or both of a velocity and acceleration of the second traffic participant.

14. The method of claim 12, wherein the road traffic factor is at least one selected from the group consisting of a traffic sign, a traffic light, a road marking, and a trajectory of an object proximate to the second traffic participant.

15. The method of claim 12, wherein the predicted trajectory of the second traffic participant proximate to the vehicle is determined based on a predicted trajectory of a third traffic participant.

16. The method of claim 12, wherein the second image includes a historic trajectory of the second traffic participant.

17. The method of claim 12, wherein the predicted trajectory is determined based on the detected road factor and the second image using a deep learning network.

* * * * *